No. 619,476.  
J. H. GERRY.  
MECHANICAL TIME SWITCH FOR TWO-RATE ELECTRIC METERS.  
(Application filed May 5, 1898.)  
(No Model.)  
Patented Feb. 14, 1899.  
3 Sheets—Sheet 1.
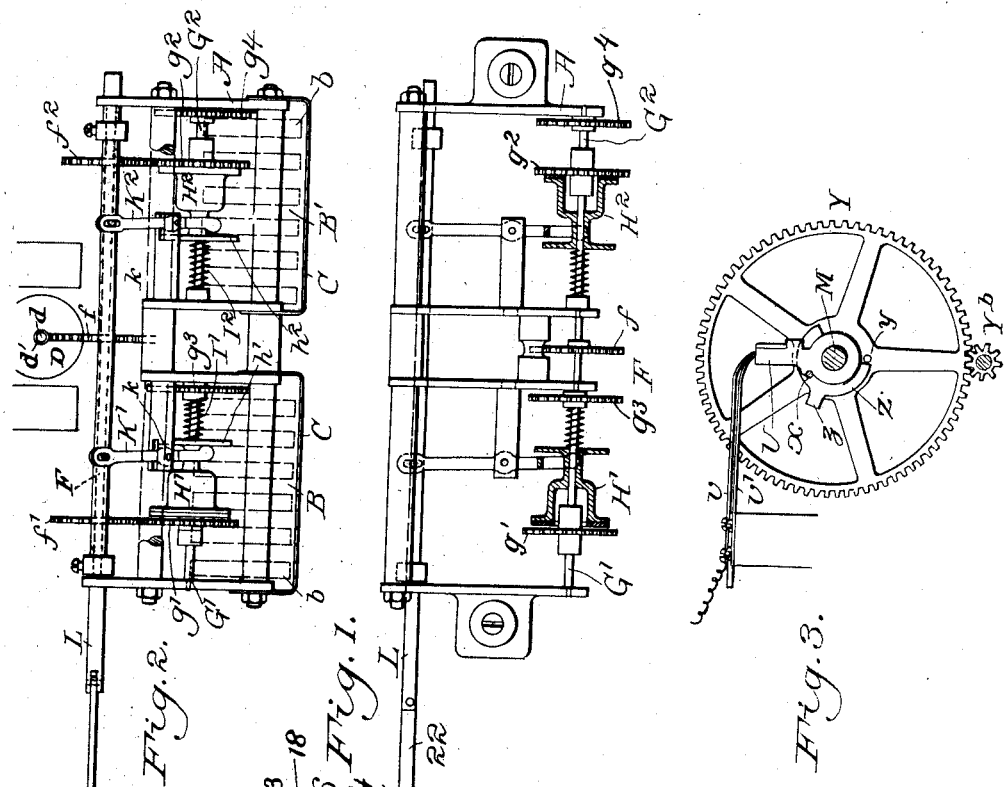
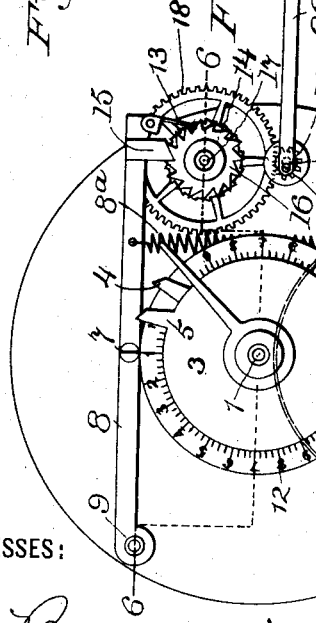
WITNESSES:
INVENTOR  
James H. Gerry  
BY  
ATTORNEY No. 619,476. Patented Feb. 14, 1899.
J. H. GERRY.
MECHANICAL TIME SWITCH FOR TWO-RATE ELECTRIC METERS.
(Application filed May 5, 1898.)
(No Model.) 3 Sheets—Sheet 2.

WITNESSES:
M. V. Bidgood
Fred Hundred

INVENTOR
James H. Gerry
BY
I. Harry Smith
ATTORNEY

No. 619,476. Patented Feb. 14, 1899.
J. H. GERRY.
MECHANICAL TIME SWITCH FOR TWO-RATE ELECTRIC METERS.
(Application filed May 5, 1898.)
(No Model.) 3 Sheets—Sheet 3.
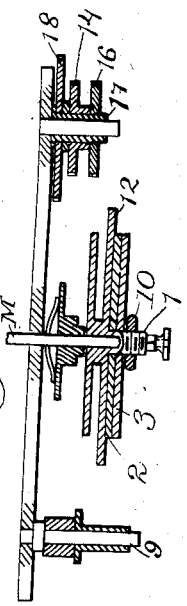
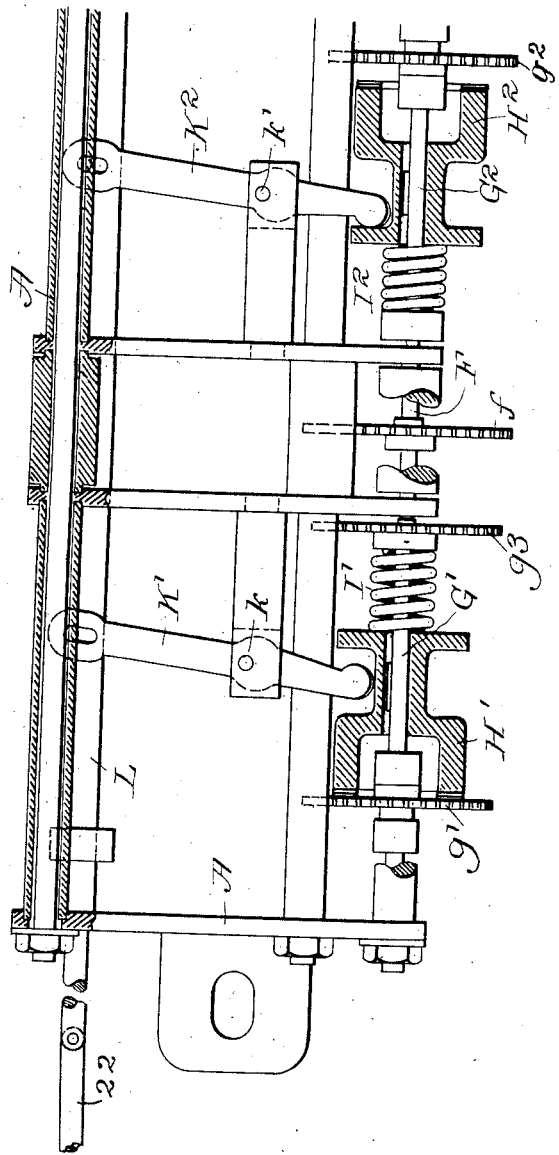
WITNESSES:
INVENTOR
James H. Gerry
BY
ATTORNEY

UNITED STATES PATENT OFFICE.

JAMES H. GERRY, OF NEW YORK, N. Y., ASSIGNOR TO THE SELF WINDING CLOCK COMPANY, OF SAME PLACE.

MECHANICAL TIME-SWITCH FOR TWO-RATE ELECTRIC METERS.

SPECIFICATION forming part of Letters Patent No. 619,476, dated February 14, 1899.

Application filed May 5, 1898. Serial No. 679,848. (No model.)

*To all whom it may concern:*

Be it known that I, JAMES H. GERRY, a citizen of the United States, residing at New York, (Brooklyn,) in the county of Kings and State of New York, have invented certain new and useful Improvements in Mechanical Time-Switches for Two-Rate Electric Meters, of which the following is a specification.

This invention relates to improvements in switches for placing the operative mechanism of an electric meter alternately in connection with different recording-dials, the changes being made periodically under the influence of a clock mechanism.

The ultimate object of such a device is to enable the consumption of electric current or energy in the circuit connected to the meter to be recorded on different dials at different periods, thus enabling separate accounts to be made of the consumption during such respective periods. For this purpose I provide a clock mechanism connected to a mechanical switch or clutch which throws the meter-operating devices into mechanical connection with two dials or other recording devices alternately at periodic intervals determined by adjustable controlling mechanism comprised in or operated by the clock.

Figure 4:
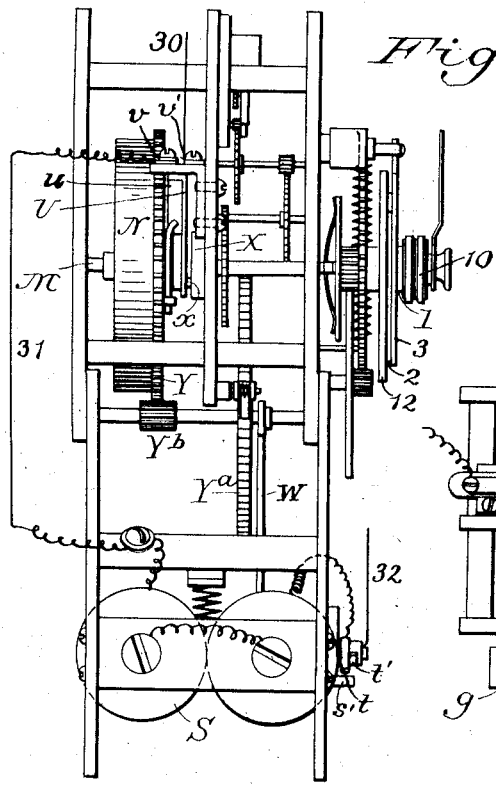
Figure 5:
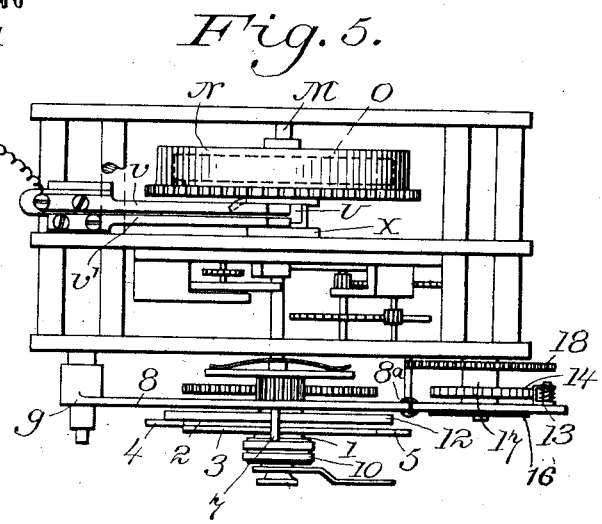
Figure 8:
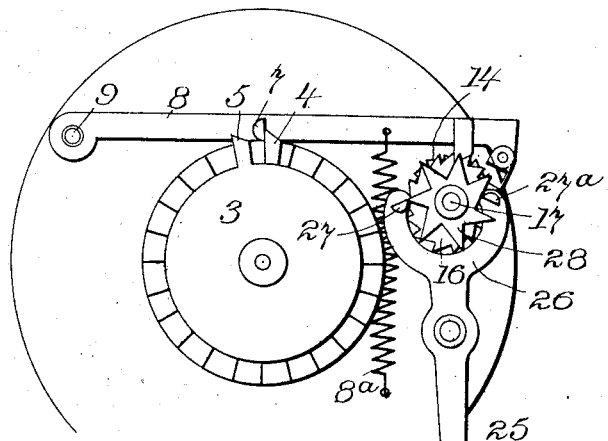

Referring to the accompanying drawings, which form a part of this specification, Figure 1 is a partly-sectional front view of the mechanical switch, the clock, and the connections between them. Fig. 2 is a top view of the mechanical switch, showing its connection to the meter mechanism. Fig. 3 is a detail view of the rewinding-contacts. Figs. 4 and 5 are respectively side and top views of the clock mechanism. Fig. 6 is a section of the controlling devices in the clock on the irregular line 6 6 in Fig. 1. Fig. 7 is an enlarged vertical section of the dial clutch mechanism. Fig. 8 shows a modified form of the controlling device operated by the clock.

The mechanical switch or clutch mechanism is mounted in a frame A, which may also support the two dials or recording or indicating devices B B', which are here shown as consisting of a series of numbered disks $b$, registering with holes in the plates C, the said dials engaging with one another in a well-known manner, so as to operate as a revolution counter or indicator. These registering mechanisms are connected to the meter-operating devices, such as the shaft $d$ of the ordinary meter-armature D, by means of mechanical switch or clutch devices.

The meter-shaft $d$, through worm $d'$ and worm-gear $f$, drives the counter-shaft F at a rate proportional to the consumption of current or energy in the circuit to which the meter is connected. Gear-wheels $f'$ $f^2$ on shaft F engage with gear-wheels $g'$ $g^2$, loosely mounted on the clutch-shafts G' G², respectively, which carry gear-wheels $g^3$ $g^4$, engaging with the respective dial-movements. These gear-wheels also constitute members of the respective clutch devices, the other clutch members being in the form of sleeves or collars H' H², which are splined or otherwise arranged on shafts G' G² so as to turn therewith, but to be capable of sliding longitudinally thereon. Springs I' I² tend to hold the clutch members H' H² against the clutch members $g'$ $g^2$, respectively, and levers K' K², pivoted to the frame at $k$ $k'$, are capable of bearing against flanges $h'$ $h^2$ on the clutch members H' H², so as to hold said members away from the clutch members $g'$ $g^2$. A rod L, arranged to slide in the frame, is connected to each of the levers K' K², so that movement of this rod in one direction or the other will operate the clutch members. The clutch devices are reversely arranged, as indicated, so that the same movement of rod L that brings lever K' against flange $h'$, and thus removes clutch member H' from member $g'$, operates simultaneously to carry lever K² away from flange $h^2$, thus allowing spring I² to force clutch member H² against member $g^2$. Thus when the clutch $g'$ H' is released the clutch $g^2$ H² is engaged, and vice versa, and the meter-driving mechanism is thus brought alternately into engagement with one or the other of the dial-movements, according to the position of the controlling-rod L.

This mechanical switching device is connected to a clock mechanism, preferably such as indicated in Figs. 1, 3, 4, 5, and 6. M represents the main arbor of such clock mechanism, on which is loosely mounted the mainspring-barrel N. Within this barrel is the mainspring, (indicated by broken lines at O in Fig. 5,) one end of this spring being connected to the barrel and the other end to the main arbor in the usual manner. Suitable means are provided for rewinding this barrel at intervals, so as to restore the tension of the spring, such means consisting, preferably, of a magnet S, whose armature $s$ engages with a winding-lever W, carrying a pawl $w$, engaging with a ratchet-wheel $Y^a$, whose shaft carries also a pinion $Y^b$, gearing with a wheel Y, fixed to the mainspring-barrel N, said magnet being connected in circuit with a suitable source of electric supply—for example, the circuit whose output is to be measured. The armature $s$ of the magnet operates by its stud $s'$ suitable make-and-break devices, such as contact-springs $t\,t'$, included in the magnet connections, so that as the armature is attracted it opens its own circuit and is then retracted by gravity or otherwise, so as to again allow the springs $t\,t'$ to close its circuit, a vibrating motion of the armature being thus maintained as long as the energizing-circuit of the magnet is otherwise unbroken. Spring-contacts $v\,v'$, mounted on the clock-frame, are also included in this energizing-circuit and coöperate with a contact-arm U, loosely mounted on the mainspring-shaft M. A pin $x$ projects from a collar X, fixed to the mainspring-arbor M. When the mainspring has about run down, the pin $x$, engaging with arm U, brings it in contact with springs $v\,v'$ and the magnet-circuit is established. The magnet thus vibrates its armature and turns wheel Y step by step until a pin $y$ on said wheel, engaging with an intermediate plate Z, loosely mounted on the arbor M, brings the lug $z$ on said plate against the insulating-plate $u$, fixed to arm U, and moves said arm U out of contact with springs $v\,v'$. The above mechanism constitutes a rewinding device, whereby the clock is rendered self-winding at intervals.

The main arbor M drives the usual clock-gearing, comprising the hour-shaft 1, which is arranged to revolve once in twenty-four hours and on which are frictionally mounted two plates or disks 2 3, carrying, respectively, arms 4 5, which engage with a pin 7 on lever 8, pivoted at 9 to the clock-frame and provided with a retracting-spring $8^a$. A screw-clamp 10 is provided to tighten up the disks 2 3 to any desired amount, and a dial 12, fixed to the hour-arbor 1, is provided with time divisions, so that the arms 4 5 can be set or adjusted independently to operate at any desired time and to engage successively and alternately with lever 8 to operate the wheels 14 18 by successive movement in the same direction. The lever 8 engages at its outer end by a pawl 13 with a ratchet-wheel 14 and by a stop 15 with a stop-wheel 16, the said ratchet-wheel and stop-wheel being both fixed to a shaft 17, which also carries a gear-wheel 18, engaging with a pinion 19 on a shaft 20. This shaft 20 is connected by suitable means, such as a crank-wheel 21, to one end of a connecting rod or link 22, whose other end is pivoted to the controlling slide-rod L of the mechanical switching device hereinbefore described. The parts are so adjusted that each stroke of the lever 8 will turn the crank-wheel 21 one-half revolution, and thus move the slide-rod L one way or the other, thereby shifting the connections of the meter-gear from one dial to the other. The upper ends of arms 4 5 are inclined, as shown, and the pin 7 is inclined or rounded on its rear face, so that the arms as they pass under the pin raise it and then allow it to fall suddenly under the influence of spring $8^a$. The upward movement of the lever moves the pawl 13 up sufficiently to engage in the next tooth above, and the subsequent downward movement of the lever then drives the ratchet-wheel around the distance of one tooth, the stop 15 engaging at the same time with a tooth of stop-wheel 16 and preventing the ratchet-wheel from being moved more than one tooth at a time.

As the plates 2 3, with their arms 4 5, can be adjusted independently, so as to come into operation at any desired time, the times at which the meter mechanism is changed or switched from one dial to the other may be varied at will; but as long as the adjustment remains the same the clock will continue to make the changes aforesaid at the same times from day to day, and being self-winding it will not require any attention, except occasional inspection.

In the modification shown in Fig. 8 the motion of ratchet-wheel shaft 17 is imparted to the mechanical switching device by a lever 25, whose fork 26 carries pins 27 $27^a$, engaging on opposite sides of a star-wheel 28, fixed to said shaft 17, so that as the ratchet-wheel 14 turns the space of one tooth this star-wheel, through means of pins 27 $27^a$, throws the lever 25 one way or the other, and thus correspondingly moves the slide-rod L, to which said lever 25 is connected in any suitable manner.

The electrical connections of the rewinding-magnet are indicated in Fig. 4, the line connection 30 being connected to contact $v'$, and the connection being continued, when contacts $v\,v'$ are connected by arm U, from contact $v$ through wire 31 to magnet S, and thence through the circuit-breaker $t\,t'$ of the magnet to the other side of the line connection at 32. The supply-line from which the magnet S is thus energized is preferably the same line that is connected to the meter-operating motive devices.

Having thus described my invention, what I claim as new, and desire to secure by Letters Patent, is—

1. The combination of an electric-meter-operating mechanism, a plurality of dial mechanisms, mechanical switching devices for mechanically connecting the meter-operating mechanism to one or other of the dial mechanisms, a clock, comprising two independently-adjustable controlling devices, a lever engaging with both of said controlling devices and operated in the same direction successively and alternately thereby means for moving said lever in the other direction and connections from said lever to the mechanical switching devices to move the latter in reverse directions in the successive operation in the same direction of the said lever by the respective controlling devices.

2. The combination of an electric-meter-operating mechanism, a plurality of dial mechanisms, mechanical switching means for mechanically connecting the meter-operating mechanism to one or the other of the dial mechanisms, a clock comprising two adjustable controlling devices, a lever engaging with both said devices, a wheel engaging with said lever, and means connected to said wheel for operating the mechanical switching device.

3. The combination of an electric-meter-operating mechanism, a plurality of dial mechanisms, mechanical switching devices for mechanically connecting the meter-operating mechanism to one or the other of the dial mechanisms, a clock comprising two adjustable arms, a lever engaging with said arms, and carrying a pawl and a stop, a ratchet-wheel engaging with said pawl, a stop-wheel engaging with said stop, a shaft on which the said ratchet and stop wheels are mounted, a shaft connected by gearing to said ratchet-wheel shaft, and having a crank-and-link connection to the mechanical switching devices.

4. The combination of an electric-meter-operating mechanism, a plurality of dial mechanisms, mechanical switching means for mechanically connecting the meter-operating mechanism to one or the other of the dial mechanisms, a clock comprising two adjustable controlling devices, a lever engaging with both said devices, a wheel engaging with said lever and operated in one direction by the successive movements thereof, and means connected to said wheel for operating the mechanical switching device in opposite directions on the successive movements of said wheel.

5. The combination of an electric-meter-operating mechanism, a plurality of dial mechanisms, mechanical switching devices for mechanically connecting the meter-operating mechanism to one or other of the dial mechanisms, a clock comprising two independently-adjustable controlling devices, a lever engaging with both of said controlling devices and carrying a pawl, a ratchet-wheel engaging with said pawl, and mechanical connections from the ratchet-wheel to the mechanical switching devices.

JAMES H. GERRY.

Witnesses:
HARRY E. KNIGHT,
M. V. BIDGOOD.